Patented July 31, 1945

2,380,552

UNITED STATES PATENT OFFICE 2,380,552

POLYMERIZATION IN AQUEOUS EMULSION

Waldo L. Semon, Silver Lake, and William D. Stewart, Akron, Ohio, assignors to The B. F. Goodrich Company, New York, N. Y., a corporation of New York No Drawing. Application October 21, 1941, Serial No. 415,935

3 Claims. (Cl. 260—84.5)

This invention relates to the polymerization of unsaturated organic compounds in aqueous emulsion and particularly to a method of treating the inside surfaces of ferrometallic vessels whereby such vessels may advantageously be employed as chambers for conducting such polymerizations.

It is known that the vessel in which polymerizations in aqueous emulsion are conducted may profoundly affect the course of the polymerization and the type of polymer obtained. When it is attempted to carry out polymerizations in vessels made of a ferrometallic material such as iron or steel, the polymerization reaction is strongly inhibited by these materials and in many cases the polymerization fails to take place. Other materials from which polymerizers might be constructed are not altogether suitable because a deposit of polymer forms on the walls of the vessel thereby reducing the heat conductivity of the vessel and the yield of the desired type of product. These and other difficulties as well as the corrosion problems accompanying polymerizations in aqueous emulsion have made the selection of materials of construction for polymerizers very difficult. Despite its fragility, poor heat conductivity and expensiveness as compared to certain metals, glass has been the material ordinarily selected for this purpose.

We have now discovered that vessels constructed of a ferrometallic material such as iron, steel or a ferrous alloy may be rendered suitable for use as vessels for conducting polymerization in aqueous emulsion by treating the inside surfaces of such vessels with a phosphorus compound capable of reacting with metallic iron at the surface to produce an insoluble coating of an iron phosphate. Ferrometallic vessels whose surfaces in contact with the emulsion during the polymerization have been treated to change them from metallic iron to phospates of iron no longer exert an inhibiting effect on polymerization and in some cases actually exert a catalytic action. Accordingly, this invention comprises polymerizing an unsaturated organic compound in aqueous emulsion in a ferrometallic vessel in which the surfaces in contact with the emulsion during the polymerization have been treated to convert them from metallic iron to phosphates of iron.

The treatment of the inside surface of the polymerizer to convert the metallic iron at the surface into phosphates of iron may be carried out by any one of a number of known methods. Thus the metallic surface may be treated with either a dilute or concentrated aqueous solution of a phosphoric acid such as ortho- or pyro-phosphoric acid or with a solution of an alkali salt of a phosphoric acid, or with a solution containing a phosphoric acid and one or more metallic phosphates. An aqueous solution containing phosphoric acid, and one or more metallic phosphates such as the ortho- or pyro-phosphates of iron, manganese, copper, chromium or zinc is particularly effective in rapidly producing a coating of metallic phosphates on the metallic surface. A solution containing phosphoric acid and an iron phosphate produces a coating which is especially advantageous for the inside surfaces of polymerizers. Alternately, the phosphate coating may be applied by treating the metallic surface with a phosphorus compound dissolved in an organic liquid such as a solution of phosphoric acid in a volatile oil or a solution of phosphorus oxychloride in pyridine. In the latter case it is believed that the phosphorus oxychloride and pyridine combine with the metallic iron at the surface to form a coating of an insoluble phosphate-pyridine-pyro-phosphate-iron complex.

Treatment of the inside surface of the ferrometallic polymerizer may be carried out by filling the polymerizer with the desired treating solution at an elevated temperature, preferably at the boiling point of the solution, and allowing the solution to remain in contact with the metallic surface for the time required to produce the phosphate coating, which time will depend upon the nature of the particular solution employed. Spraying of the phosphating solution onto the inside surface is also effective in producing the desired phosphate coating. It is, of course, desirable to clean the metallic surface thoroughly before treatment to remove any rust and to rinse and dry the coated surface after treatment and before polymerization.

In an experiment designed to determine the effect of a ferrometallic material having a surface coating of an insoluble iron phosphate on emulsion polymerization, a black cast iron strip was immersed in an aqueous solution containing 5% of ortho-phosphoric acid, $H_3PO_4$, and 0.1% of ferric pyro-phosphate at 100° C. After 48 hours the strip was removed, washed with water, with a hot soap solution and finally with a 0.5% aqueous solution of sodium pyro-phosphate. The treated iron strip was then placed in a glass vessel together with an aqueous emulsion containing butadiene and acrylonitrile and the aqueous emulsion was polymerized. The polymerization proceeded in a normal manner and was complete after 64½ hours at 30° C. Successive polymerizations were then carried out in the presence of the same iron strip, all of which proceeded in the normal manner. After four polymerizations the iron strip was still in good condition and only a very small amount of polymer had deposited on the strip. The latices formed by the polymerizations were coagulated to form high quality synthetic rubbers which, when vulcanized, had tensile strengths of 4000-5000 lb./sq. in.

When the experiment was repeated employing a similar black iron strip which was not treated with the phosphating solution, the polymerization was completely inhibited, there being no polymer formed after five days at 30° C. Although the iron strip did not rust nor corrode appreciably, the polymerization having been conducted in an alkaline emulsion, it was impossible to carry out the polymerization in the presence of this metallic strip.

Other experiments in which similar iron strips were treated with various phosphating solutions and then tested in emulsion polymerizations show that no harmful effect on the polymerization is brought about by ferro-metallic materials which have had their metallic surface converted into an iron phosphate surface. In one experiment in which an iron strip was treated with a pyridine solution containing 1% of phosphorus oxychloride for 48 hours at room temperature before being tested in an emulsion polymerization of butadiene and acrylonitrile, the polymerization actually proceeded at a faster rate than did a similar polymerization carried out in the absence of such a treated iron strip. Thus it is seen that by the practice of this invention a ferrometallic surface which strongly inhibits polymerization may be converted into a surface which catalyzes polymerization.

Ferrometallic vessels whose inside surfaces have been treated so as to change them from metallic iron to insoluble phosphates of iron may be used as chambers for conducting any emulsion polymerization regardless of the nature of the compound polymerized and of the other components which may be present in the emulsion. Thus, many unsaturated organic compounds including vinyl halides such as vinyl chloride, vinyl esters such as vinyl acetate, acrylic esters such as methyl methacrylate, olefins such as isobutylene, styrene and vinyl naphthalene, conjugated dienes such as butadiene, isoprene, 2,3-dimethyl butadiene and chloroprene and mixtures of two or more unsaturated organic compounds such as vinyl chloride and vinyl acetate, butadiene and acrylonitrile, butadiene and methyl methacrylate, butadiene and styrene, etc., may be polymerized in aqueous emulsion in such vessels. The emulsion may be either alkaline, acid or neutral depending upon the emulsifying agent employed in forming the emulsion. If it is desired to affect the polymerization in acid medium salts of hymolal bases such as diethylaminoethyloleylamide, cetyl trimethylammonium sulfate and the like may be employed as emulsifying agents while fatty acid soaps such as sodium oleate, sodium stearate, sodium myristate or the like may be employed to form alkaline emulsions and hymolal sulfates and sulfonates such as sodium lauryl sulfate and sodium isopropyl naphthalene sulfonate may be employed to form emulsions in a pH range from over ten to three or less.

Other materials such as polymerization initiators, catalysts, activators, modifiers or the like which have elsewhere been described as being useful in emulsion polymerizations may also be present in the emulsion polymerized in the vessels described herein.

It is to be understood that many other variations and modifications in the nature of the emulsion polymerized and in the method of converting the inside ferrometallic surface of the polymerizer to a surface of insoluble phosphates of iron will occur to those skilled in the art and may be effected without departing from the spirit and scope of the appended claims.

We claim:

1. The method which comprises polymerizing butadiene in aqueous emulsion in a ferrometallic vessel having a coating of insoluble iron phosphates on its inside surfaces contacting the emulsion during the polymerization.

2. The method which comprises copolymerizing butadiene and acrylonitrile in aqueous emulsion in a ferrometallic vessel having a coating of insoluble iron phosphates on its inside surfaces contacting the emulsion during the polymerization.

3. The method which comprises copolymerizing butadiene and styrene in aqueous emulsion in a ferrometallic vessel having a coating of insoluble iron phosphates on its inside surfaces contacting the emulsion during the polymerization.

WALDO L. SEMON.
WILLIAM D. STEWART.